United States Patent [19]

Jerie

[11] Patent Number: 5,024,523

[45] Date of Patent: Jun. 18, 1991

[54] MAP PROJECTION SYSTEM

[75] Inventor: Hans G. Jerie, Enschede, Netherlands

[73] Assignee: Ambridge Limited, Hong Kong, Hong Kong

[21] Appl. No.: 460,000

[22] Filed: Oct. 19, 1989

Related U.S. Application Data

[63] Continuation of Ser. No. 339,895, Apr. 18, 1989, abandoned, which is a continuation of Ser. No. 173,643, Mar. 25, 1988, abandoned, which is a continuation-in-part of Ser. No. 788,116, Oct. 16, 1985, abandoned.

[30] Foreign Application Priority Data

Oct. 19, 1984 [NL] Netherlands ................ 8403193

[51] Int. Cl.$^5$ ............ G08G 1/137; G03B 21/23; G03B 21/28
[52] U.S. Cl. ........................ 353/11; 353/12; 353/25; 340/995
[58] Field of Search ............ 353/25, 26, 27, 11, 353/12, 81, DIG. 2; 33/1 M; 340/995; 364/424.01, 424.02

[56] References Cited

U.S. PATENT DOCUMENTS

| 2,314,497 | 3/1943 | Hargrave et al. | 353/11 |
|---|---|---|---|
| 2,548,488 | 4/1951 | Mella | 353/12 |
| 3,450,472 | 6/1969 | Warden | 353/11 |
| 3,848,980 | 11/1974 | Plummer | 353/81 |
| 4,097,134 | 6/1978 | Jerie | 353/11 |
| 4,312,577 | 1/1982 | Fitzgerald | 353/12 |
| 4,437,739 | 3/1984 | Haskin | 353/11 |
| 4,505,913 | 3/1985 | Miura et al. | 353/12 |
| 4,675,676 | 6/1987 | Takanabe et al. | 340/995 |

FOREIGN PATENT DOCUMENTS

| 708327 | 4/1965 | Canada | 353/12 |
|---|---|---|---|
| 1245604 | 7/1967 | Fed. Rep. of Germany . | |
| 2658855 | 6/1978 | Fed. Rep. of Germany | 353/11 |
| 3138874 | 4/1983 | Fed. Rep. of Germany | 353/11 |
| 2447068 | 8/1980 | France . | |
| 6817810 | 6/1970 | Netherlands . | |

*Primary Examiner*—Thomas B. Will
*Assistant Examiner*—William C. Dowling
*Attorney, Agent, or Firm*—Watson, Cole, Grindle & Watson

[57] ABSTRACT

In apparatus for displaying map information, at least two maps of the same terrain but of different scale from one another are provided on a movable platform so that a portion of one of the images can be selected and displayed through an optical lens projection system of fixed magnification onto a projection screen and displaying through the optical lens projection system a portion of the selected portion of the one of the map images on the projection screen to examine the display of the other map image in that detail permitted by the scale of the other of the map images at the fixed magnification.

6 Claims, 6 Drawing Sheets

MAP PROJECTION SYSTEM

CROSS REFERENCE TO RELATED APPLICATION

This application is a continuation of application Ser. No. 07/339,895 filed Apr. 18, 1989, and now abandoned which was a continuation of application Ser. No. 07/173,643 filed Mar. 25, 1988, and now abandoned which was a continuation-in-part of application Ser. No. 06/788,116 filed Oct. 16, 1985, and now abandoned.

BACKGROUND OF THE INVENTION

In my prior U.S. Pat. No. 4,097,134, and in other prior art cited in my copending application, various methods and apparatus for displaying map information are proposed. This prior art is relatively complex and expensive. In general, the prior art may use a fixed magnification with a continuous map image of one scale, at times in conjunction with a parallel image strip illustrating places of interest along the route. In other instances, the displaying optical system may be of variable magnification to allow zooming in on a particular area of interest on the route being displayed. One of the difficulties attendant upon variable magnification, aside from the complexity and expense of the optical system, is the fact that any lettering or indicia used for identification purposes will be usable only at low magnification and at high magnification will tend to obscure or obliterate the enlarged image, or at lower magnifications, will be too small to be intelligible.

Accordingly, it is an object of the invention to provide a map projection system which addresses the problems extant in the prior art.

In one aspect, the invention concerns the method of displaying map information which comprises the steps of providing at least two map images of the same terrain but of different scales from each other; selecting a portion of one of the map images and displaying such selected portion at fixed magnification to permit examination of the display with the detail determined by the scale of the one map image and the fixed magnification; and then displaying, at the fixed magnification, a portion of the other of the map images which corresponds with an area of the selected portion of the one of the map images to examine the display of the other map image in that detail permitted by the scale of the other of the map images at the fixed magnification.

In another aspect, the invention concerns the method of displaying map information which comprises the steps of providing at least two map images of the same terrain but of different scales from each other; displaying a selected portion of one of the map images at fixed magnification; and switching the display from the selected portion of the one of the map images to a corresponding selected portion, at the same fixed magnification, of the other of the map images. In this way, a simple, compact and relatively inexpensive optical system of fixed magnification is employed at all times while the viewer is permitted to switch from a display of a particular portion of one map image to a display of a corresponding portion of another map image of a different scale. In this way, a display of a portion of a small scale map image will reveal a large area of small detail and by switching to the corresponding portion of a larger scale map image, greater detail will be revealed. As used herein, "corresponding portion" is meant to refer to corresponding portions of two (or more) map images of different scales in the sense that the central point of each such portion will be the same. That is, it will be appreciated that although the display area does not change in size, when switching from a display of one map image scale to another, the relative area of map image being displayed will change. However, the system is such that the center point of the display of any scale map image will always be centered when switching takes place so that if the viewer switches while the center point of the displayed map image is on or about on the region in which he is most interested, the display when switched will still be centered on the same center point and the new display will encompass the desired region irrespective of the scale to which switched.

In accord with an object of the invention, it is of importance that the magnification remain fixed in order to simplify the optical system utilized and to avoid the use of movable parts or components which could introduce distracting and unacceptable movement of the displayed information. This is particularly important if the system is to be employed in, for example, automobiles or the like.

The invention is also concerned to provide an apparatus which comprises the combination of at least two map images of the same terrian but of different scales from each other; means for displaying a selected portion of one of the map images at fixed magnification to permit examination of the display with the detail determined by the scale of the one map image and the fixed magnification, and for also displaying, at the fixed magnification, a portion of the other of the map images which corresponds with the selected portion of the one of the map images to permit examination of the display of the other map image in that detail determined by the scale of the other of the map images at the fixed magnification.

Apparatus of this invention also concerns a support having images of at least two maps having different scales and depicting the same terrain areas, the map image of smaller scale being of small size compared with the size of the other map image of larger scale, means for displaying a portion of a selected one of the map images at a fixed magnification, and means for switching the fixed magnification display from the portion of the selected one of the map images to a corresponding portion of the other map image.

It will be further appreciated that the system according to this invention requires that the composite of the map images, whether there be two or more separate images, be accurately oriented between or among the separate images of different scales. This accuracy is necessary in order to simplify the arithmetic operations involved in switching from one map image to another. For example, a particular point on a map image having one scale is easily defined in terms of its orthogonal coordinates but also requires a knowledge of the various map image scales involved if a switch to the same particular point on a map image of different scale is to be effected. Further, simplification is maintained if the relative displacements between the optical system and the map image composite are effected in consonance with the orthogonal coordinates. Still further, simplification is maintained if the shapes of each separate map image of the composite are rectangular, with the edges or borders of each map image extending in the coordinate directions. Another consideration of a practical nature concerns elimination of dual display or partially blank display which could occur under certain circumstances. For example, if two map images are closely adjacent or in touching relation, parts of both map images could be displayed at the same time, or if the edge or border of a map image is overlapped in the display and no other map image is adjacent, the display will be partially blank where the display extends beyond the border. Elimination of these phenomena may be effected by limiting relative movement between the optical system and the map image composite so that the center point of a square display may not approach the border by a distance less than one half the width of the field of view of the display.

Another object of the invention is to provide a microfiche representation of spatially separate first and second map images of the same terrain and having different scales so as to be examined individually at fixed magnification to reveal details of corresponding portions of the map images permitted by the individual scales of the two map images and the fixed magnification.

These and other objects of the invention will become more apparent as this description proceeds.

BRIEF DESCRIPTION OF THE DRAWING FIGURES

DETAILED DESCRIPTION OF THE INVENTION

Figure 1:
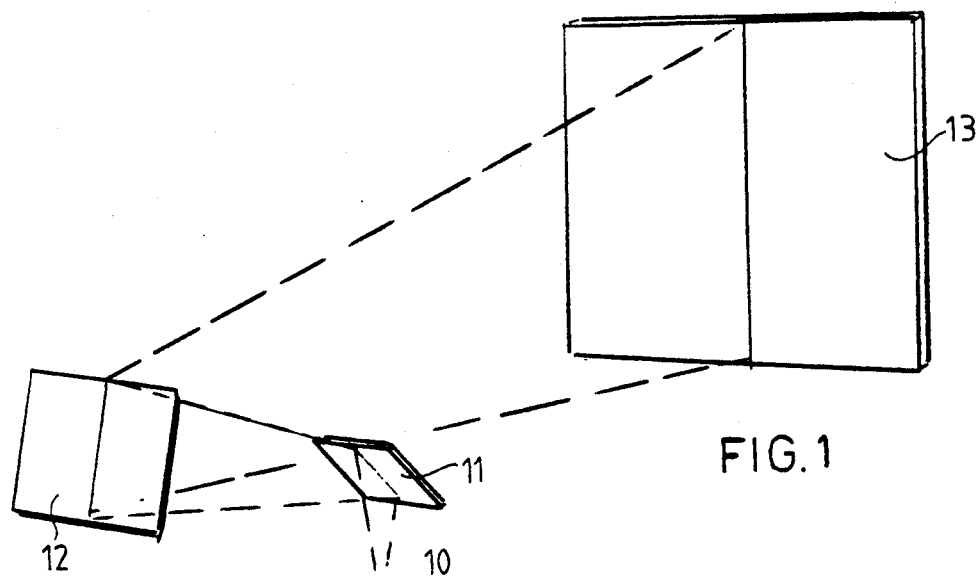
FIG. 1 is a perspective view of one embodiment of the invention.

FIG. 1 shows a cassette 1 comprising two transparent platens 2, 3, between which a slide-positive film 4 carrying map information is movable between two supply reels 5 and 6. The cassette is movable in two relatively perpendicular or orthogonal directions in accordance with arrows 7 and 8, respectively. At one side of the film 4 an illumination device 9 is positioned, while at the other side of the film 4 a lens-system 10 (schematically indicated as a single lens) is positioned and behind which two mirrors 11, 12, respectively, are present for folding the light path and projecting the desired map information on a projection screen 13 for display. The projection screen 13 may be a ground glass platen, so that a user of the apparatus can see the projected image on the other side.

Figure 2:
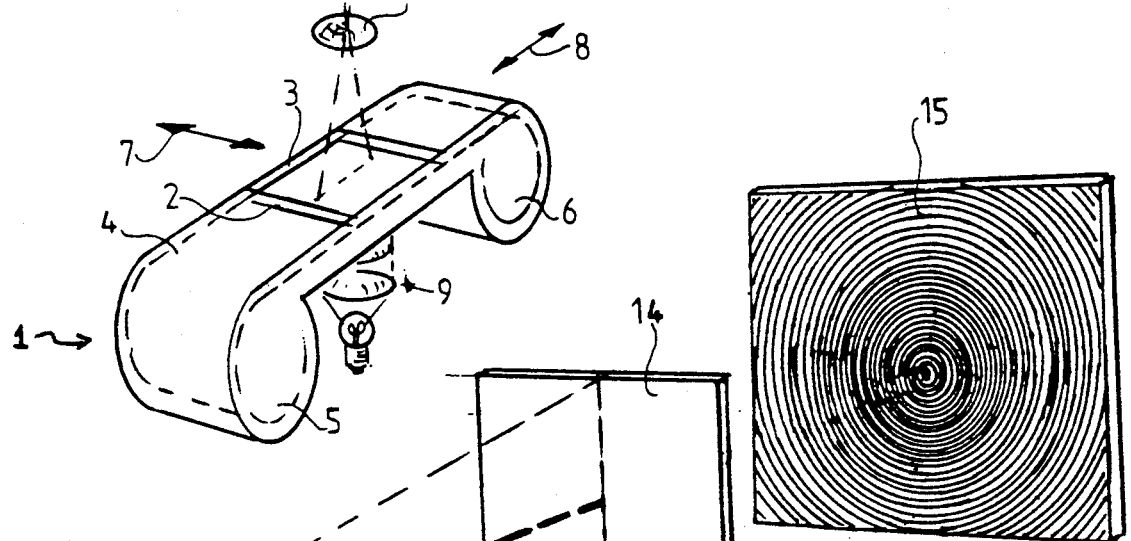
FIG. 2 is a view similar to FIG. 1 but illustrating another embodiment.
Figure 2:
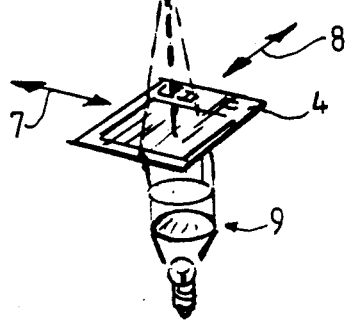

FIG. 2 shows a variant. Corresponding elements have been referred to with the same reference numerals as in FIG. 1. In this embodiment the image is projected on a relatively small projection screen 14 and the user can observe that projected image through a Fresnel-lens 15 of the positive type, arranged at a suitable distance from the projection screen 14. Thus a user can see a virtual image at a large distance through the lens, due to which his eyes do not need to accommodate.

Figure 3:
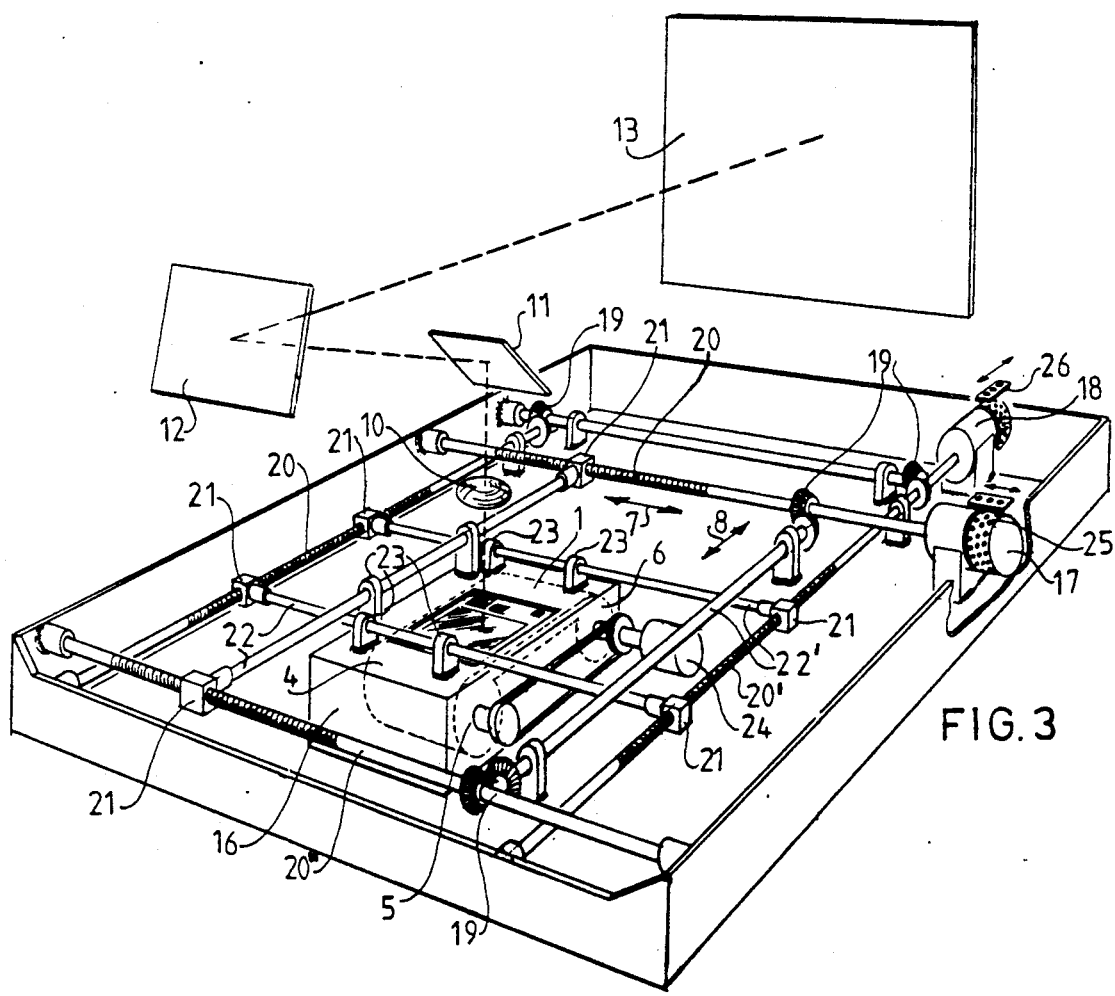
FIG. 3 is a perspective view of a further embodiment of the invention.

FIG. 3 illustrates apparatus for effecting relative movement between the optical system and the map image composite, elements corresponding to those already described in in connection with FIG. 1 being referred to with the same reference numerals.

In the embodiment according to FIG. 3, the cassette 1 is carried by a cassette cartridge 16, movable by means of two motors 17 and 18, respectively, according to arrows 7 and 8. The motor 17 directly drives the lead screw 20 whereas the motor 18 directly drives the lead screw 20'. The lead screw 20" is parallel to the lead screw 20 and is driven in unison with it through the bevel gear drives 19 associated with the coupling shaft 22. These two lead screws travel the nuts or blocks 21 on the shafts 22 back and forth in response to opposite directions of rotation of the lead screws. Similarly, back and forth motions of the shafts 22', 22' are effected by rotations of the lead screws 20', 20' acting on the nuts 21 on the coupling shafts 22', 22'. The coupling shafts 22, 22 and 22', 22' act as guide bars along which the the eyes 23 may slide so that the cassette cartridge 16 may be displaced in the orthogonal directions 7 and 8.

A motor 24 controls the transport of the film 4 when scrolling of the film is to be effected to move from exposure of one map image composite for display to another map image composite containing other map image information.

The motors 17 and 18 are coupled with manually operating means, not shown, or by means of position transducers or sensors 25, 26 included in servo loops, adjusting the desired part of a map and projection thereof on projection screen 13.

Figure 4:
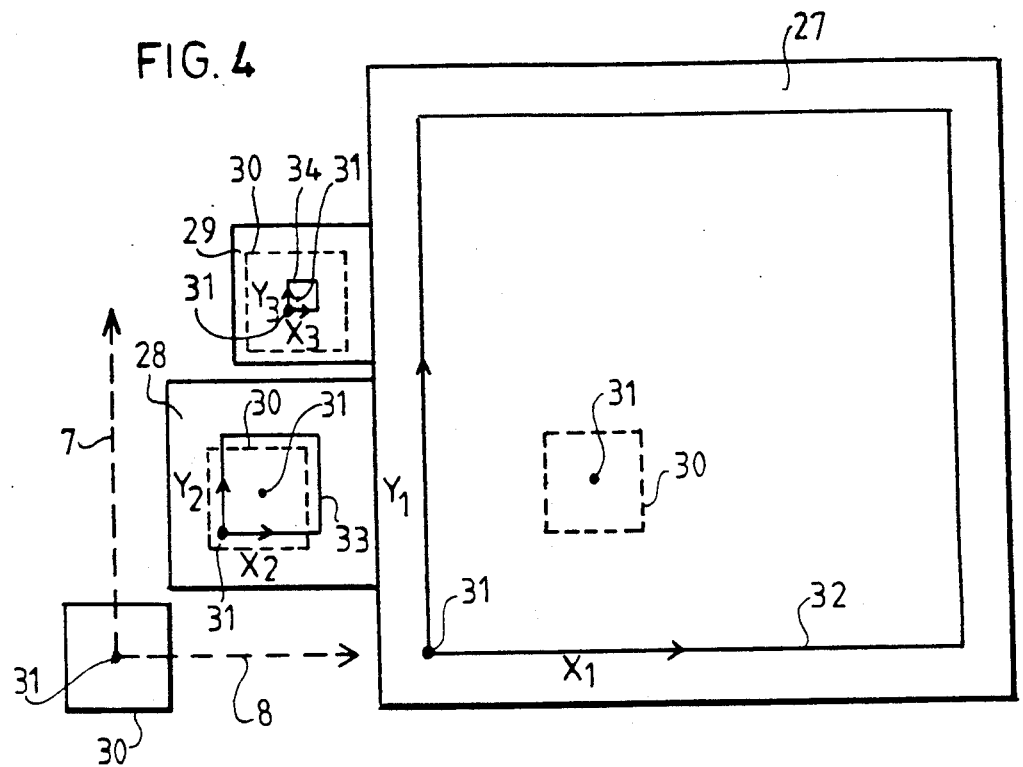
FIG. 4 is a plan view of a map image composite according to this invention plus an illustrative diagram.

FIG. 4 shows three maps 27, 28, 29, respectively, of the same region, on the scales 1:200,000 (large scale), 1:1,000,000 (medium scale) and 1:3,000,000 (small scale), respectively. These maps are present on a film in slide-positive or microfiche form. A framework 30 indicates the scanning area of the lenses-system 10 according to the previous figures. This framework 30 has a square shape and the middle is indicated by reference numeral 31. The directions 7 and 8 are indicated relative to this middle point as a center of the coordinate system. In map 27 the framework 30 is shown again with interrupted lines in order to indicate the part that eventually is visualized, i.e. projected. Close to the left lower corner of map 27 the center 31 is shown again. Relative to that point again a square framework 32 is drawn. This framework 32 is the ultimate limit of the center 31, before which not yet a black rim becomes visible at the projection. Mutatis mutandis this is also valid for maps 28 and 29. The related limits, within which the middle point 31 may be displaced are indicated here with the frameworks 33, 34, respectively. It will be obvious that the distance between the sides of the ultimate edges of maps 27, 28, 29 and the middle point 31 of framework 30 has to be identical for all three maps.

Figure 5:
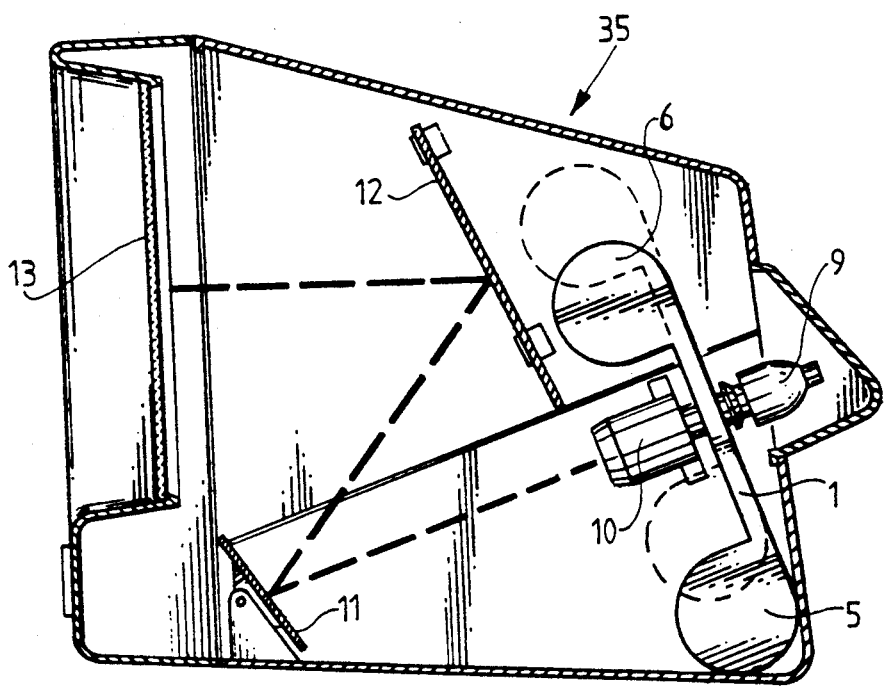
FIG. 5 is a sectional view of an assembly according to the principles of FIG. 1.

FIG. 5 shows a section of an apparatus 35, which is a further elaboration of the example schematically indicated in FIG. 1. In FIG. 5, again, the same reference numerals as in FIG. 1 are used for corresponding elements.

With reference to FIG. 5 it will be clear that the apparatus 35 may have a compact construction, in such a way that it is well suited for application in an automobile.

Figure 6:
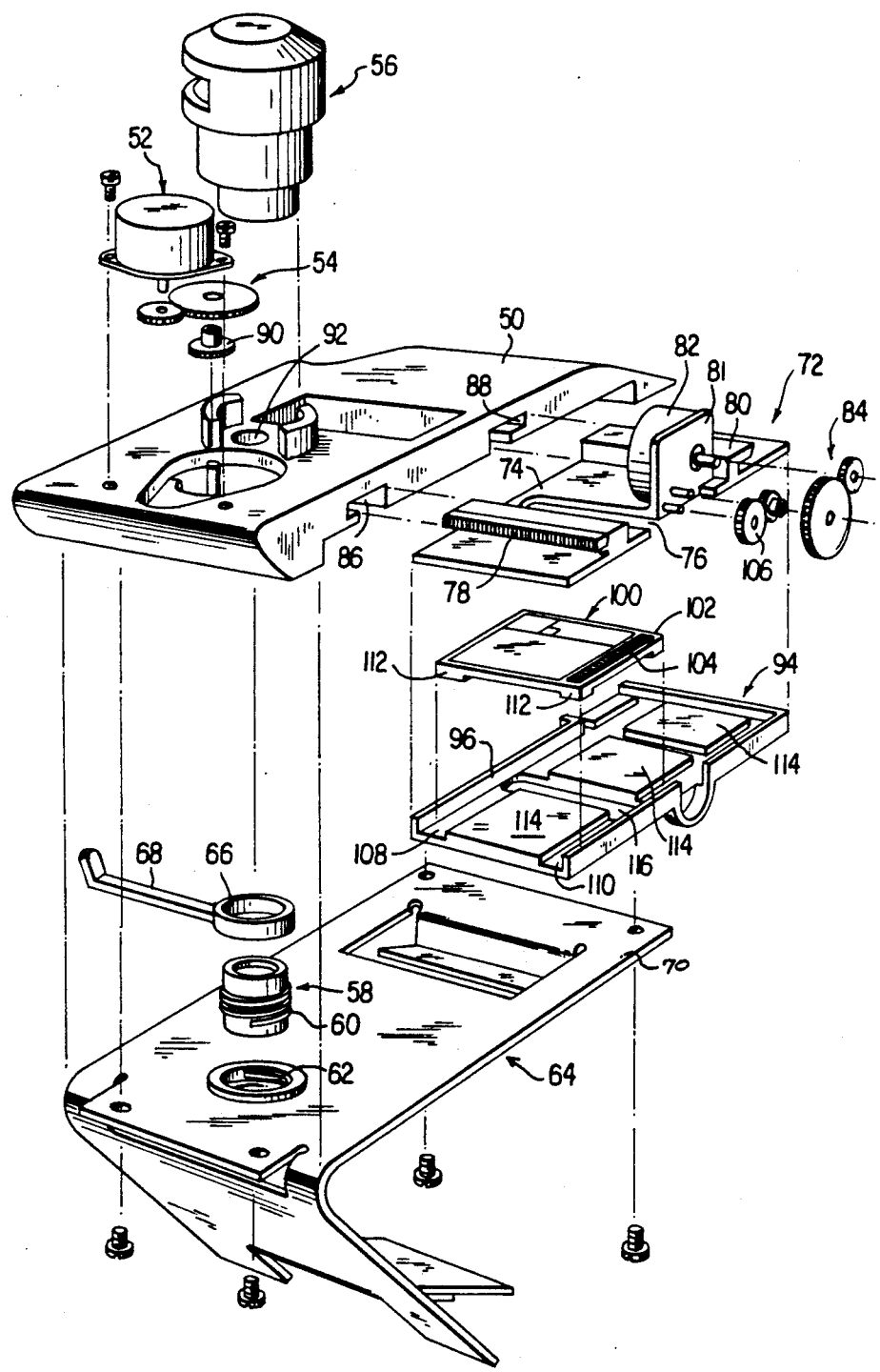
FIG. 6 is an exploded perspective view of a preferred embodiment of the invention.

FIG. 6 illustrates a preferred embodiment of the invention in exploded perspective form of the important components. Thus, a casing cover 50 is shown upon which the motor 52 and its gear drive 54 as well as the light source housing 56 are mounted. The fixed magnification lens system is illustrated at 58 having its adjustment thread 60 adapted to be received in the internal thread 62 of the frame member 64 and shown associated with the collar 66 and lever 68 which may be manually swung to effect the desired focus of the lens system 58. As will be clear from FIG. 9, the entire assembly of FIG. 6 may be enclosed within the housing H and the plate portion 70 is affixed to the underside of the cover 50 to define a pocket within which the unit 72 (FIG. 6) is slidably received.

The unit 72, as best seen in FIG. 6, includes the top plate 74 having the transverse slot 76, the toothed rack 78 of generally L-shape and the L-shape guide 80. The top plate also includes the mounting ear 81 for the motor 82 and the drive gear assembly 84 is associated with the motor 82. The L-shaped rack assembly 78 and the L-shaped guide 80 are slidably recieved in the respective transverse slots 86 and 88 in the underside of the cover 50 so that the top plate 74 and components mounted and carried thereon may freely slide back and forth. It will be understood that when so guided by the cover, the spur gear 90 of the drive gear assembly 54 engages the rack 78 so that rotation of the motor 52 travels the top plate assembly 74 back and forth, dependent upon the direction of motor rotation, in the direction of the related orthogonal motion. The slot 76 in the top plate registers with the opening 92 through which the light source housing 56 projects the light source illumination.

The bottom plate 94 has a raised peripheral edge 96 engaging against the underside of the top plate 74 to which it is secured and the other orthogonal direction end 98 of the bottom plate 94 defines a slot or opening therewith which slidably receives the map image composite 100 including its support 102. The support 102 includes the rack 104 along one edge, as shown, which engages with the spur gear 106 of the gear drive 84 which effects back and forth sliding of the support 102. The unit which is the map image composite and its support is freely slidable within the space between the top plate and the bottom plate, the latter having troughs 108 and 110 slidably receiving the corner feet 112 of the unit and raised table portions 114 providing solid support for the underside of the support 102.

Figure 9:
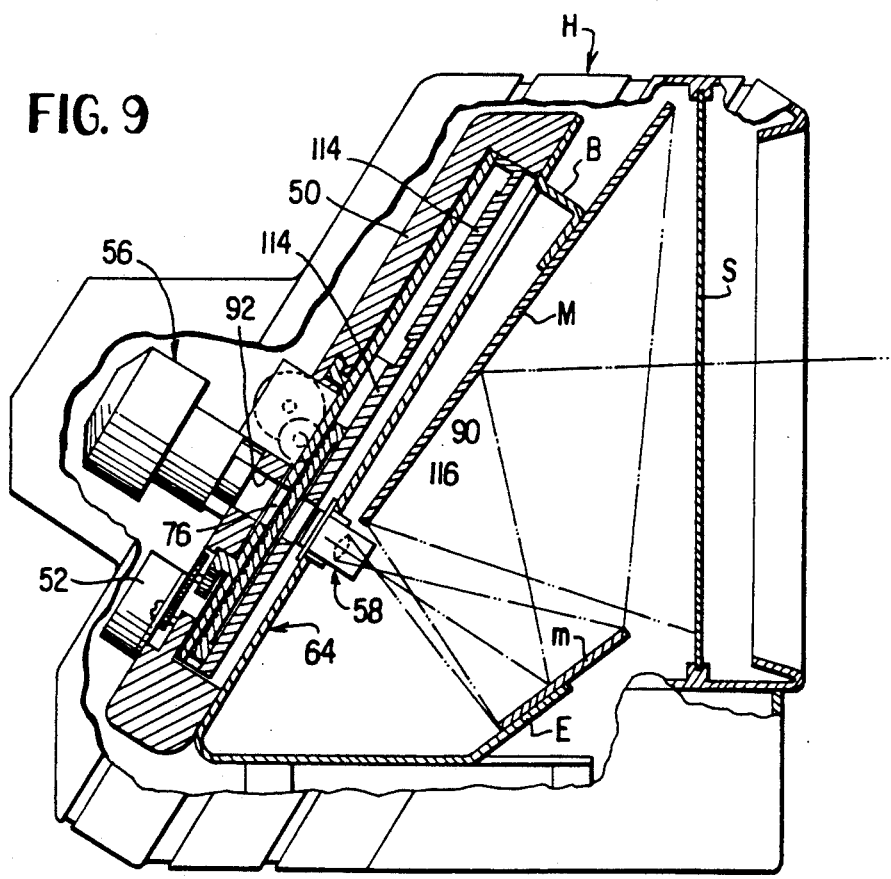
FIG. 9 is a vertical section taken through a completed assembly in accord with the embodiment of FIG. 6.

To complete the assembly, it is to be noted that the mirror M is mounted on the bracket B and the mirror m on the ear E as in FIG. 9 to fold the optical axis as shown and project the magnified image of the appropriate portion of the map image composite through the screen S for display.

Figure 7:
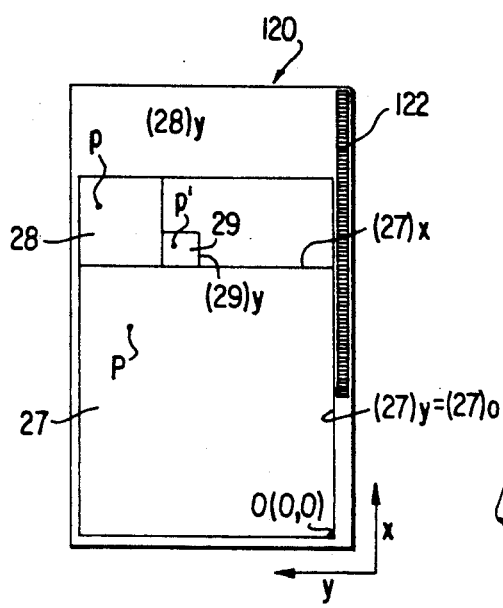
FIG. 7 is a plan view of a modified form of map image composite and support therefor.
Figure 8:
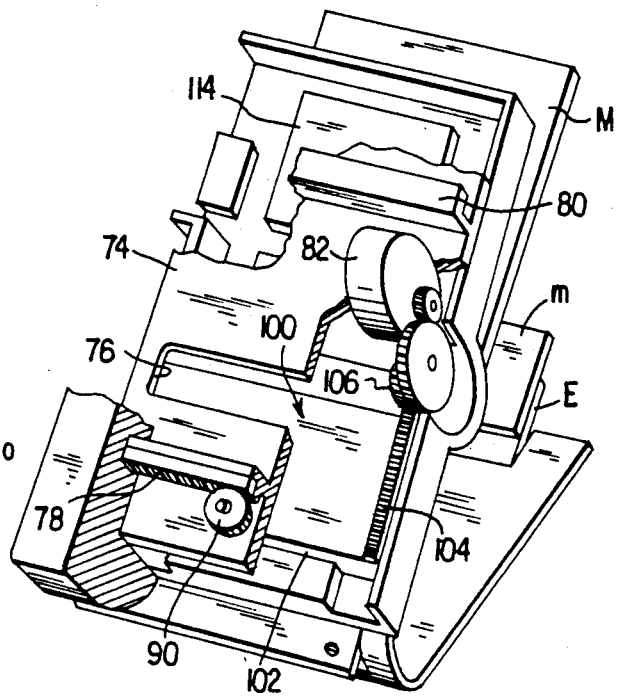
FIG. 8 is a perspective view of a portion of the embodiment of FIG. 6 but in assembled form.

The unit illustrated in FIG. 7 includes the support 120 with its rack 122 and mounting the map image composite comprising the three map images 27, 28 and 29 as in FIG. 4 having the different scales which are to be displayed with fixed magnification. From FIG. 7, assuming the direction of motion corresponding to the direction 7 or X direction is the direction back and forth along which the rack 122 extends, and that the direction along which the rack 78 of the support 74 extends is therefore the Y direction 8, it will be appreciated that a common coordinate system for the map images can be defined in terms of the angular rotations of the two motors 52 and 82. However, since the scales of the map images are different, to find a point on one map image which corresponds with the same point on the other map images, information concerning the scales of all map images and information concerning the coordinate positions of certain of the the borders of the map images comes into play for the particular spatial orientation of the map images as illustrated. Thus, with the images oriented as shown, information must be known defining the x values of the bottom and top edge borders of the map image 27 in the common coordinate system, which would be $(27)_{x1}$ and $(27)_{x2}$ where $(27)_{x1}$ is less than $(27)_{x2}$, that defining the y values of the right-hand edge border of the map image 27 in the common coordinate system, which would be $(27)_{y1}$. Using this notation, the intersection of the right-hand edge border and the bottom edge border of the map image 27, would define the x,y values 0,0 of the origin O of the common coordinate system, although it will be appreciated that the x and y values 0,0 of such origin are entirely arbitrary and that the 0,0 values were chosen for the purposes of this discussion to make the calculations which follow more simple and straightforward. Additionally, information defining y values for the right-hand edge borders of the other map images 28 and 29 must be known. Thus, the y values of such borders are $(28)_{y1}$ and $(29)_{y1}$. Lastly, the values of the respective scales A, B and C of the map images 27, 28 and 29 must be known. These values are, in accord with those previously given, are in the proportions of 1, 5 and 15, so that the ratio of the scale of the map image 27 to that of the map image 28 would be 1/5, the ratio of the scale of the map image 27 to the scale of the map image 29 would be 1/15, the ratio of the scale of the map image 28 to the scale of the map image 29 would be ⅓. Therefore, in the common coordinate system, to switch from the arbitrary point $P_{x,y}$ on the map image 27 in FIG. 7 to the corresponding point $P_{x,y}$ on the map image 28, would require the following calculation:

X distance motor drive from $P_x$ to $p_x = (27)_{x2} - P_x + P_x[R1]$, where R1 is the ratio of the scale A of the map image 27 to the scale B of the map image 28. Using the scales disclosed above, R1 would equal 1/5.

Y distance motor drive from $P_y$ to $p_y = (28)_{y1} + -P_y P_y[R1]$.

Similarly, to switch from the point $P_{x,y}$ on the map image 27 to the corresponding point $p'_{x,y}$ on the map image 29:

X distance motor drive from $P_x$ to $p'_x = (27)_{x2} - P_x + P_x[R2]$, where R2 is the ratio in scales between the map images 27 and 29, or R2 = 1/15 from the above disclosure.

Y distance motor drive $= (29)_{y1} + -P_y P_y[R2]$.

Lastly, to switch from the point p on the map image 28 to the corresponding point p' on the map image 29:

X distance motor drive from $p_{x,y}$ to $p'_{x,y} = (27)_{x2} + p_x[R3]$, where R3 = 1/3 from the above disclosure.

Y distance motor drive from $p_{x,y}$ to $p'_{x,y} = (29)_{y1} + -p_y p_y[R3]$.

From the above, it should be understood how the calculations are to be made in switching back and forth between corresponding points on any two of the map images.

Figure 10:
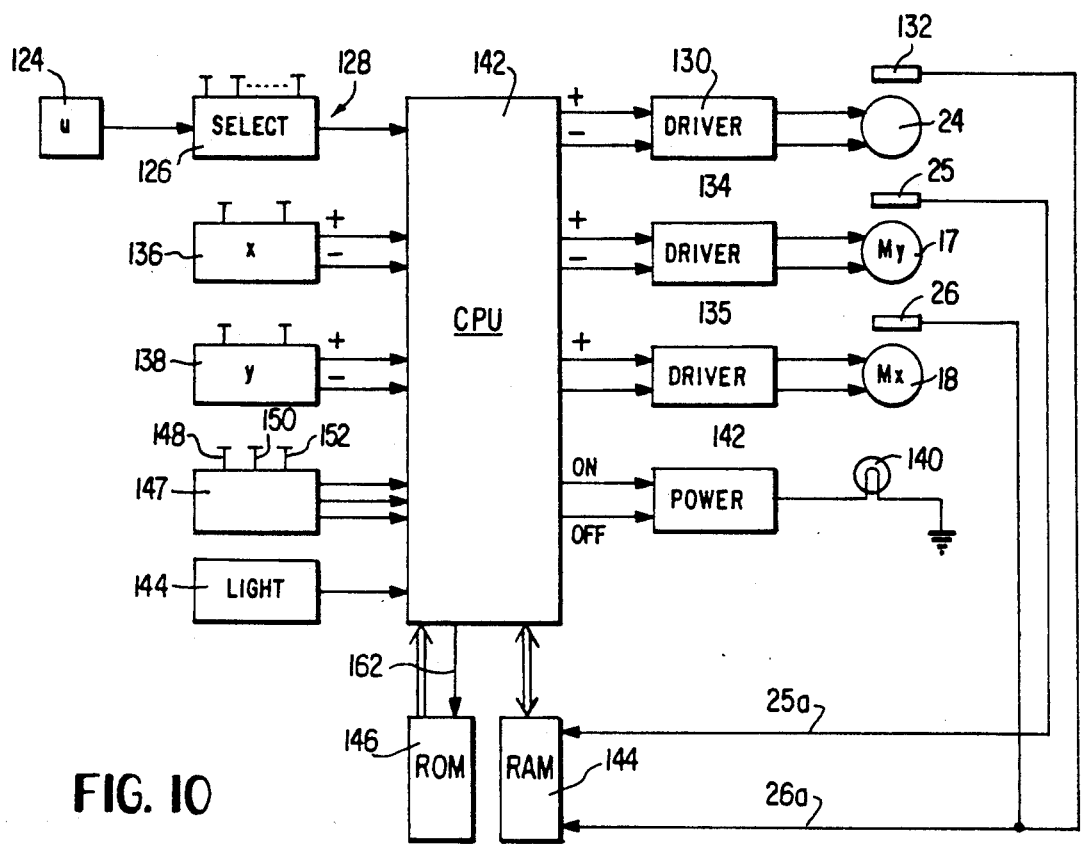
FIG. 10 is a schematic diagram of a control and processing arrangement of the invention.

With reference to FIG. 10, a control system in accord with the above calculations and relating to the embodiment of FIG. 3 is illustrated. The microprocessor of this control system includes the CPU 142 which is programmed to perform different routines in response to certain inputs. In general, the following manual inputs effect the stated functions:

MANUAL INPUTS/FUNCTIONS

1. Insert cassette 1—prepares the system to generate an input signal to scroll the microfiche film to a particular selected map image composite.
2. Depress map image composite selection button—to complete signal input to the motor 24 to scroll to the selected map image composite.
3. Depress the light switch button—turns the optical system light source "on".
4. Enter x and/or y drive button controls—energizes the motors 17 and/or 18 to position display as desired.
5. Depress map image switch selection button—initiates calculations to switch the display from a particular center point of one map image to the corresponding display center point of the selected map image, with optical light source "off" function during calculations and movement to the new display position whereupon the light source is returned to "on".

In FIG. 10, the normally open microswitch 124 responds to and is closed by the introduction of the cassette 1 carrying the map image composite microfiche film into the x,y transport system. The map image composite selection switch 126 includes a plurality of buttons 128 corresponding to the number N of map image composites which are contained on the microfiche film and depression of a selected button 128 provides the input to the CPU to generate the + or − outputs to the driver 130 for the motor 24 to rotate it in the proper direction to scroll the microfiche film so that the selected microfiche map image composite N is exposed for display. The sensor 132 stores the scrolled x coordinate position $(COMP)N_{Ox}$ of the film in the RAM 144 and the CPU refers to this information which is present in the ROM 146 for each composite N on the film and terminates the drive to the scroll motor 24 when the selected film position $(COMP)N_{Ox}$ is reached. This selected position corresponds to the value $O_x$ for the selected composite N and the CPU also energizes the driver 134 to drive the motor 17 to attain the value y=0 so that the selected composite position is at the origin O (see FIG. 7) for that composite. Thus, in this embodiment, the initial reference position is always the origin O for the particular map image composite under consideration.

The operator may move the display to any selected position on the map image 27 by depressing the + or − button on the x control switch 136 and/or the + or − button on the y control switch 138. The CPU responds, in each case, by energizing the driver 134 to rotate the motor 17 in the proper direction or to energize the driver 135 to rotate the motor 18 in the desired direction. A shift to another map image 28 or 29 may be effected if desired by depressing the proper one of the shift buttons 148, 150 or 152. In response, the map image selector 147 initiates the calculations in the CPU to effect the desired change to switch the display from a particular center point of one map image to the corresponding display center point of the selected map image, with optical light source 140 power source 142 "off" during calculations and movement to the new display position whereupon the light source is returned to power "on". The operator may also power the light source "off" and "on" by manipulation of the switch 144.

The ROM 146 contains the necessary information to effect the calculations subsequently required, as has been described for the spatial orientation of the map images in accord with FIG. 7 so that when one of the map selection manual switches 148, 150 or 152 is actuated to send a signal to the CPU, the calculations required to switch between the points P, p or p' of the map images of the composite in question is performed. The calculations are effected in accord with normal programming functions effected by the CPU, involving reading the actual current x and y values from the RAM, addressing the ROM over the line 162 to read the relevant information from the ROM to perform the required calculations, etc. When the calculations are taking place and for a time sufficient for the motors to respond to the commands fed over the lines to the drivers 134 and 135, the CPU deenergizes the light source 140 of the optical system for a time sufficient to allow the motors 17 and 18 to switch the display to the new, selected map image position.

Figure 11:
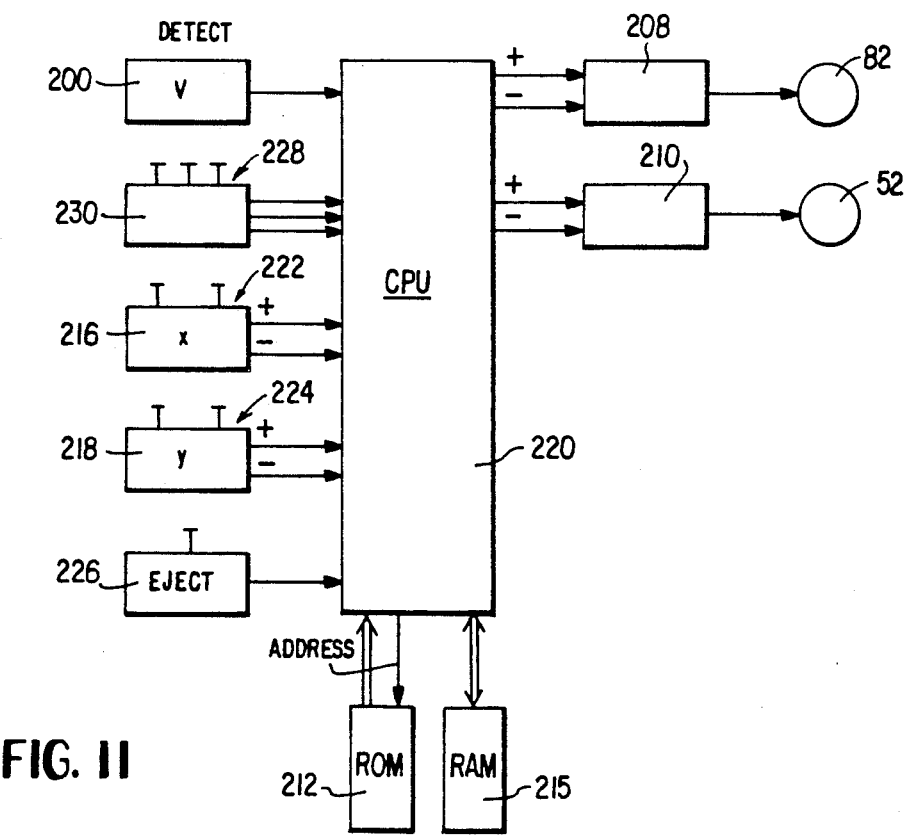
FIG. 11 is a view similar to FIG. 10 but showing a modified arrangement.

FIG. 11 illustrates the preferred control system for the preferred apparatus as illustrated in FIGS. 6–9 wherein the motors 52 and 82 are step motors. In this control system, when the microfiche is inserted partially into the device, its presence is detected by the microswitch 200 which initiates reference positioning of the microfiche composite by an input signal to the CPU 220. The respective drivers 208 and 210 are pulsed by the CPU in the proper direction of drive of the pulse motors 52 and 82 until the reference position of the microfiche is reached. The pulse drive to the motor 82 moves the microfiche and its support 100 which has been positioned in the slot between the top and bottom members 74, 94 toward the x reference position while the motor 52 "sucks" this carrier into the grooves 86 and 88 into which it is partially inserted in much the same manner a tape cassette of a VCR is drawn in. The motor 52 commences relative y movement between the optical system and the microfiche until the reference point $P_y$ value is attained while the motor 82 moves the support 110 with microfiche until the reference point $P_x$ value is attained. The correct reference point values are read from the ROM 212. It will be understood that the support assembly 100 is initially inserted until the rack 122 engages the gear 106 and that the carrier assembly is inserted until the rack 78 engages the gear 90. As before, the ROM 212 contains the information to perform all necessary calculations.

Additional manual inputs are the + and − pulse controls 216 and 218 for the motor drivers 208 and 210, each having its respective + and − buttons 222 and 224. The actual coordinate positions may be written into the RAM. The "jump" or switch from one mag image to another is effected by depressing the appropriate map selection button 228 on the switch input control 230 and in response to an input therefrom, the CPU commences the requisite calculations to perform the necessary positive or negative pulse commands to the two step motors 52 and 82. The current actual x and y positions may be stored in the RAM and updated when the jump or switch has been made. An eject switch 226 and its button for control of the motor drivers 208 and 210 initiates the function of reversing the rotations of the motors to eject the carrier until the rack 78 is no longer engaged by the gear 90 and until the rack 104 is no longer engaged by the gear 106.

In accord with preferred embodiments of this invention, the proportion of the scales of three map images is 1:4:16 and the magnification of the optical system is in the order of 25x. It is to be understood that as used herein, and as is believed to be in accord with US convention, the largest map of a composite will have the largest scale so as to display the greatest detail, etc., so that if this largest scale is 1:200,000, the above proportions will mean that the next smaller map image of the composite will have a scale of 1:800,000 and the smallest map of the composite will have a scale of 1:3,200,000. The microfiche composite film is preferably Cibachrome Micrographic material which is a diapositive material noted for its high resolution. The exposures on this material may be made from an enlarged aerial photographic master which may measure 9×9 meters, for example, suitable reduced to the requisite sizes in the proportions of 1:4:16 as noted, on the film material to produce the diapositive composite of the map images. In the process, a fixed size text may be included on each map image, the fixed text size being large enough to be read at the fixed magnification. Thus, the small scale map image may contain only text identifying various countries or states in the region denoted on the master, the next larger scale map image may contain only text identifying various cities, towns or villages within the region which can be readily seen at the fixed magnification from this larger map image, and the largest scale map image may contain only text identifying streets, etc. which can be readily seen on this largest map image at the fixed magnification.

The system is mounted for use in an automobile and may derive its power from a cigarette lighter plug. In order to conserve the automobile battery and to avoid undue heat build-up due to the high intensity nature of the halogen light source, the microprocessor is programmed to shut down the light source whenever the system has not been used by the operator for a few minutes, say two minutes. Moreover, whenever the system is commanded to switch or jump from one map image to another, the lamp is shut down automatically for a brief period (usually about 2 seconds) while calculations are being performed and the step motors carry out their movement functions. Also, the program is such that manual positioning of the step motors is restricted to a center point boundary within the confines of each map image so that the display will not encroach beyond the borders of the map images or cause a dual or overlapped display as has been noted before. The system is wired to be "on" whenever the auto ignition is on and the microprocessor program is such that if the ignition is turned off, the eject function will occur.

It will be obvious that instead of performing the calculations as specified in general above for the purpose of switching from a display on one map image to the corresponding display on another map image, the ROM may contain tables designating all of the coordinate positions of each map image so that a corresponding position on one map image may immediately be identified by transposing from the table of that one map image to the table of another map image.

Lastly, it should be noted that at the present, the step motors execute steps of 0.1 mm which are adequate for the purposes intended.

In considering this invention, the above disclosure is intended to be illustrative only and the scope and coverage of the invention should be construed and determined by the following claims.

What is claimed is:

1. A system for displaying map information which comprises the combination of a support having images of at least two map transparencies having different scales and depicting the same terrain areas, the map transparency image of smaller scale being of small size compared with the size of the other map transparency image of larger scale, optical lens projection means of fixed magnification for displaying a portion of a selected one of the map transparency images at said fixed magnification, and means for switching the fixed magnification display from the portion of the selected one of the map transparency images to a centralized corresponding portion of the other map transparency image.

2. The method of displaying map information which comprises the steps of:

providing at least two rectangular map transparency images of the same terrain but of different scales in which the ratio of scales of the smaller to the larger scale is R;

locating the two rectangular map transparency images on a common support so that they do not overlap but are oriented identically on the support and the distance in one direction from side-to-side across the map transparency of smaller scale is AR where A is a constant, the distance in direction orthogonal to the one direction from side-to-side across said map transparency of smaller scale is BR where B is a constant, the distance in the one direction from side-to-side across the map transparency of larger scale is A and the distance in the direction orthogonal to the one direction from side-to-side across said map transparency of larger scale is B;

displaying through a fixed magnification optical lens projection system corresponding portions of the map transparency images one at a time at said fixed magnification so that corresponding terrain points $P_{x,y}$ and $p_{x,y}$ of the two map transparency images as centered in the respective magnified images are related in the proportions $P_xR=p_x$ and $P_yR=p_y$.

3. A system as defined in claim 1 wherein the means for switching comprise a microprocessor having memory means for storing the coordinate positions of the center of the displayed portion of the selected one of the map images and programmed to compute the corresponding center coordinates of the corresponding portion of the other map image.

4. A system as defined in claim 3 including orthogonal drive means responsive to the microprocessor for moving the support orthogonally with respect to the means for displaying to effect switching between fixed magnification displays.

5. A system as defined in claim 4 including a receptacle defining a slot for receiving the support, the support having a first rack extending along one edge thereof, the orthogonal drive means including a first motor carried by the receptacle and a driving gear rotated by the motor and engagable with the first rack to draw the support into the receptacle along one path and to translate the support back and forth along the one path, a housing having guide slots extending along a second path orthogonal to the one path nd a second rack extending along the second path, the receptacle having guides received in the guide slots, the orthogonal drive means also including a second motor carried by the housing and a driving gear rotated by the second motor and engagable with the second rack to draw the receptacle into the housing and to translate the receptacle back and forth along the second path.

6. A map display assembly comprising a microfiche representation of spatially separate first and second map transparency images of the same terrain and having different scales to be examined individually through an optical lens projection system at fixed magnification to reveal details of corresponding portions of the map transparency images permitted by the individual scales of the two map transparency images and the fixed magnification; a substantially rigid support for the microfiche having a rack along one side edge thereof; a receptacle defining a slot for receiving the support, a motor carried by the receptacle and a driving gear rotated by the motor and engageable with the rack to draw the support into the receptacle along one path and to translate the support back and forth along the one path; and a housing having guide slots extending along a second path orthogonal to the one path and a second rack extending along the second path, the receptacle having guides received in the guide slots, the housing including a second motor and a driving gear rotated by the second motor and engaeable with the second rack to draw the receptacle into the housing and to translate the receptacle back and forth along the second path.

* * * * *